(12) United States Patent
English

(10) Patent No.: US 9,291,188 B2
(45) Date of Patent: Mar. 22, 2016

(54) MOUNTING FIXTURE AND METHOD FOR USING SAME

(71) Applicant: Douglas A. English, Loomis, CA (US)

(72) Inventor: Douglas A. English, Loomis, CA (US)

(*) Notice: Subject to any disclaimer, the term of this patent is extended or adjusted under 35 U.S.C. 154(b) by 0 days.

(21) Appl. No.: 14/589,675

(22) Filed: Jan. 5, 2015

(65) Prior Publication Data

US 2015/0219141 A1 Aug. 6, 2015

Related U.S. Application Data

(63) Continuation-in-part of application No. 14/173,766, filed on Feb. 5, 2014, now Pat. No. 8,925,172.

(51) Int. Cl.
| | |
|---|---|
| *F16B 21/00* | (2006.01) |
| *F16B 35/00* | (2006.01) |
| *A47B 13/00* | (2006.01) |
| *A47F 10/06* | (2006.01) |
| *F16B 13/08* | (2006.01) |
| *F16B 37/04* | (2006.01) |

(52) U.S. Cl.
CPC .............. *F16B 35/005* (2013.01); *A47B 13/00* (2013.01); *A47F 10/06* (2013.01); *F16B 13/0833* (2013.01); *A47F 2010/065* (2013.01); *F16B 37/045* (2013.01); *Y10T 29/49826* (2015.01); *Y10T 29/49948* (2015.01)

(58) Field of Classification Search
CPC ....................................................... F16B 21/00
USPC .................... 411/340; 108/158.11; 312/140.4
See application file for complete search history.

(56) References Cited

U.S. PATENT DOCUMENTS

| | | | | | |
|---|---|---|---|---|---|
| 3,283,640 | A | * | 11/1966 | Ono ...................... | F16B 13/068 411/33 |
| 4,033,222 | A | * | 7/1977 | Wilson ................ | F16B 19/1063 411/33 |
| 4,883,395 | A | * | 11/1989 | Klaric ........................ | A47F 5/14 411/55 |
| 8,403,612 | B2 | * | 3/2013 | Wright .................... | B60R 22/24 411/353 |
| 8,925,172 | B2 | * | 1/2015 | English ................... | F16B 13/04 108/158.11 |

* cited by examiner

*Primary Examiner* — Roberta Delisle
(74) *Attorney, Agent, or Firm* — Catherine Ashley Straight

(57) ABSTRACT

A fixture for mounting on a support structure having an outer surface and an inner surface defining a thickness, with a bore therethrough, comprising: a tubular body, having a top section and a bottom externally threaded section; a retaining sleeve with flange, having a lower portion, the bottom surface thereof larger than the bore; a drop down ring; a keeper body, having an internally threaded circular passageway, including a ring shaped upper part having an outside surface and an outside diameter slightly smaller than the diameter of the bore, and a lower part having a smaller diameter than said upper part, the retaining sleeve with flange, drop down ring, and keeper body sized for placing onto the tubular body; and pivotable, rotatable ears having an upper edge and a lower end providing a stop, mounted to the upper part of the keeper body.

19 Claims, 9 Drawing Sheets

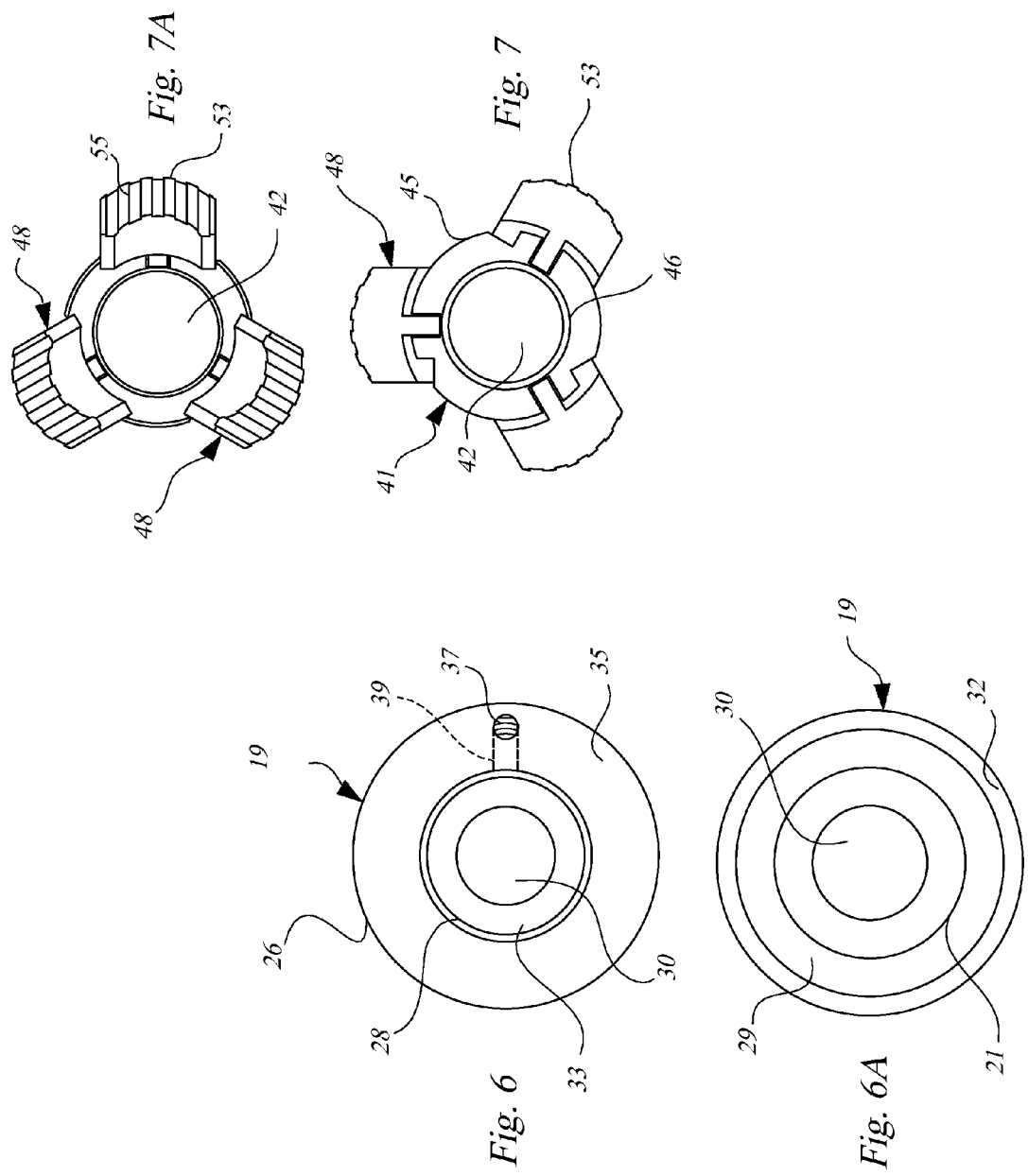

US 9,291,188 B2

MOUNTING FIXTURE AND METHOD FOR USING SAME

PRIORITY CLAIM AND CROSS-REFERENCE TO RELATED APPLICATION

This application is a Continuation-In-Part of U.S. Non-Provisional patent application Ser. No. 14/173,766, filed Feb. 5, 2014. Pursuant to the provisions of 35 U.S.C. §120, Applicant claims the priority of related application Ser. No. 14/173, 766, which application claims the priority, under 35 U.S.C. §119(e)(1), of U.S. Provisional Patent Application Ser. No. 61/760,804.

BACKGROUND OF THE INVENTION

1. Field of the Invention

The invention relates generally to a fixture for mounting on a support structure, such as a board, panel, counter, or the like, and the method for using the mounting fixture. More particularly, the invention pertains to a mounting fixture, a portion of which passes through a bore in a support structure and is secured against the inner surface of the structure, which allows the fixture to be mounted to the support structure, without the us of bolts, screws, or other fasteners on the outer surface of the structure. The invention is particularly useful where there is limited or no access to the inner surface of the structure for the placement of such fasteners. Once the fixture is mounted to the support structure, additional components may be attached to the mounting fixture. In one application, after the mounting fixture is secured to a counter, a sneeze guard support leg is attached to the top section of the mounting fixture, a pane of the sneeze guard may then be affixed to the support leg. In this application, typically two or more mounting fixtures with support legs attached would be used to affix and support opposing ends of the sneeze guard panes.

2. Description of the Prior Art

Various mounting devices and systems are used for mounting or securing an item to the surface of a structure. The simplest devices include fasteners such as nails, screws, and bolts. Other devices include various plates, brackets, and flanges, often used in conjunction with fasteners.

In the food service industry, sneeze guards are widely used as their use is frequently required by law. Although styles may vary, the typical sneeze guard has either a rigid frame, or two or more rigid and stationary support posts, and a fixed pane of glass or plastic material which provides the shield or barrier between the displayed food and the customers. Generally, the rigid frame or support posts of the sneeze guard are affixed to a support surface, such as a counter or table.

A simple form of mounting a sneezed guard is shown and described in U.S. Pat. No. 5,584,545, granted to La Vaute et al. Feet attached to the sneeze guard support legs provide three mounting holes. Two of the mounting holes are threadless, allowing for attachment by screws or other like fasteners. The third mounting hole is threaded for acceptance of a mounting bolt.

U.S. Pat. No. 4,892,366, issued to Yerman, shows a sneeze guard system having leg assemblies, each which include a base member to support the sneeze guard. Although the system is illustrated as free standing, the '366 patent discloses clamping to a table and socket mounting to a table.

Another common methods of mounting a sneeze guard to an outer surface of a structure, such as a counter top, is with a mounting flange affixed to the top surface. The flange is usually secured to the counter by screws or bolts. A sneeze guard support post is then secured to the flange.

Sneeze guard support posts may also be mounted using a flange on the inner surface of the counter, rather than on the outer surface thereof. The same types of flanges are used in this "under counter" mounting method as are used for outer surface mounting of a sneeze guard support post. The advantages of inner surface mounting include: aesthetic and sanitary considerations, in that no screws, bolts, or the like, are on or above the counter outer surface where they appear unsightly, and may collect dirt or food debris. Such mounting also has the advantage of added strength, in that a portion of the sneeze guard support post passes through a bore in the counter where the support post is secured from below the counter.

Although such "under counter" mounting has advantages, certain conditions prevent such mounting in many cases. Conditions which prevent, or make such mounting difficult, include wiring or plumbing considerations, and difficult or impossible access for an installer to secure the mounting device and/or the sneeze guard support post to the inner surface of the counter.

In contrast to the above-discussed prior art, it is an object herein to provide a mounting fixture which may be installed from above the outer surface of a support structure, such as a counter, without having to gain access to the underside of the structure.

It is a further object herein to provide a mounting fixture which is more aesthetically pleasing, with above counter components which are more easily cleaned than those described above.

It is yet a further object herein to provide a mounting fixture which enhances the strength of the mounting of additional components.

It is another object herein to provide a mounting fixture which allows electrical or plumbing lines to be passed through the support structure either from above the outer surface to below the inner surface, or from below the inner surface to above the outer surface.

SUMMARY OF THE INVENTION

The present invention provides a fixture for mounting on a support structure having an outer surface and an inner surface having a thickness therebetween, with a bore extending through said thickness, which mounting fixture comprises a tubular body, a retaining collar, a keeper body, and pivotable, rotatable ears. Each of these components is discussed below.

The tubular body has top section and a bottom section. The bottom section is right circular cylindrical, having external threads. The top section includes a plurality of flats for engagement by a wrench.

The retaining collar has an upper portion and a lower portion with an aperture passing through the center of the retaining collar. The upper portion is frustoconical and has a lower surface which is larger than the bore in the support structure to prevent the upper portion of the retaining collar from passing through the bore. The lower portion of the retaining collar is circular, with an outside diameter which is slightly smaller than the bore in the support structure. The lower portion internally threaded and the inside diameter of the lower portion is sized to be threaded onto the tubular body. The upper portion of the retaining collar has an inside diameter which is greater than the inside diameter of the lower portion, providing a ledge at the bottom of the inner surface of the upper portion. The inside diameter of the upper portion is also greater than the outside diameter of the tubular body; so that when the retaining collar is threaded onto the tubular body, an annular recess is created.

The keeper body has a threaded circular passageway passing therethrough. The diameter of the passageway is sized to be threaded onto the tubular body. The diameter of the upper part of the keeper body is slightly smaller than the diameter of the bore in the support structure. The diameter of the upper part of the keeper body is greater than the diameter of the lower part of the keeper body.

One or more pivotable, rotatable ears are mounted to the outside of the upper part of the keeper body. The ears are pivotable from a first closed position, wherein the diameter through the closed ears is no greater than the outer diameter of the lower portion of the retaining collar, to a second open position wherein the ears deploy away from the center axis of the passageway in the keeper body. The ears are provided with limit stops to them from opening too far. The ears are also provided with biting surfaces on the upper edges thereof.

In another embodiment of the invention, the mounting fixture further includes a sneeze guard support post which is attached to the top section of the tubular body. The tubular body is a right circular cylindrical tube, having external threads on the bottom section. The hollow portion of the tube is of sufficient size to allow the passage of electrical wire or water line therethrough. The retaining collar further includes a threaded hole extending through from the outer surface to the inner surface, and a set screw sized and configured to be placed within the threaded hole. The sneeze guard support post is a right circular cylindrical tube. The inside diameter of the support post is slightly larger than the outside diameter of the tubular body, and the outside diameter of the support post is slightly smaller than the inside diameter of the upper portion of the retaining collar. The lower end of the support post is in nesting relation with the ledge and inner surface of the retaining collar and is secured by the set screw.

The method for mounting the fixture on the support structure comprises steps described following. First, the retaining collar is threaded onto the tubular body with the second diameter of the retaining collar facing toward the top section of the tubular body. Second, the keeper body is threaded onto the tubular body with the ears facing toward the top section of the tubular body. The retaining collar and the keeper are threaded onto the tubular body to positions so that the distance between the lowest surface of the retaining collar and top most surface of the ears attached to the keeper, when the ears are in the closed position, is greater than the distance between the outer surface and an inner surface of the support structure around the area of the bore in such structure. With the ears in the closed position the tubular body, the keeper and the ears, and the lower portion of the retaining collar are passed through the bore in the support structure. The ears are deployed into an open position, the retaining collar is rotated into the desired position respective to the support structure surface, and the tubular body is rotated to draw the keeper against the inner surface of the support structure, securing the mounting fixture to the structure.

In the event the position of the mounting fixture needs to be adjusted, some adjustment may be made by changing the position of the retaining collar and the tubular body. The mounting fixture may be removed or replaced by completely unthreading the tubular body from the keeper, in which case the keeper will fall from the lower end of the tubular body. The keeper may then be retrieved and reused, or if unretrievable, may be replaced with a new keeper for reinstallation of the mounting fixture.

In yet another embodiment, the present invention provides a fixture for mounting on a support structure having an outer surface and an inner surface having a thickness therebetween, with a bore extending through said thickness, which mounting fixture comprises a tubular body, a retaining sleeve with flange, a drop down ring, a keeper body, and pivotable, rotatable ears. In this embodiment, the retaining sleeve with flange replaces the retaining collar of the first embodiment. The retaining sleeve with flange has an upper portion and a lower portion with an aperture passing through the center of the retaining sleeve. The upper portion of the retaining sleeve is right circular cylindrical and the lower portion is flared to form the flange. The lower flanged portion has a lower surface which is larger than the bore in the support structure to prevent the retaining sleeve from passing through the bore. The upper portion of the retaining sleeve with flange has an inside diameter which is greater than the inside diameter of the lower flanged portion, providing a ledge at the bottom of the inner surface of the upper portion. A groove in, and encircling the ledge may also be provided. The inside diameter of the upper portion of the retaining sleeve is also greater than the outside diameter of the tubular body; so that when the retaining sleeve with flange is placed over the tubular body, an annular recess is created. The lower portion of the retaining sleeve with flange preferably is circular, however, many other shapes such as square, faceted, or scalloped are possible provided that the lower portion is larger than the bore in the support structure. The portion of the retaining sleeve with flange from the ledge to the lower surface is internally threaded and the inside diameter of the threaded portion is sized to be threaded onto the tubular body. The drop down ring is an additional structure which is placed between the retaining sleeve with flange and the keeper body. The drop down ring has a hole passing through the center, said drop down ring further has a top side and a bottom side, and an inner surface and an outer surface. In the preferred embodiment, the lower portion of the outer surface of the drop down ring is tapered, resulting in a smaller outer diameter of the drop down ring at bottom side than at the top side. The diameter of the drop down ring across the top side of the drop down ring is slightly smaller than the bore in the support structure. The hole in the drop down ring is sized to slide over the tubular body.

It will be appreciated that the retaining sleeve with flange may replace only the upper portion (that shown as frustoconical in the drawings) of the retaining collar, leaving the lower portion of the retaining collar generally unchanged. A resulting flanged retaining collar has an upper portion and a lower portion with an aperture passing through the center of the flanged retaining collar. The upper portion include a top section which is right circular cylindrical and a bottom section which is flared to form a flange. The flanged bottom section has a lower surface which is larger than the bore in the support structure to prevent the upper portion of the flanged retaining collar from passing through the bore. The lower portion of the retaining collar is circular, with an outside diameter which is slightly smaller than the bore in the support structure. The lower portion internally threaded and the inside diameter of the lower portion is sized to be threaded onto the tubular body. The upper portion of the flanged retaining collar has an inside diameter which is greater than the inside diameter of the lower portion, providing a ledge where the point where the inside diameter reduced. The inside diameter of the upper portion is also greater than the outside diameter of the tubular body; so that when the retaining collar is threaded onto the tubular body, an annular recess is created.

It will be further appreciated that the drop down ring may be incorporated into any of the embodiments of the invention discussed. By way of example, the drop down ring may be used in the first embodiment wherein it is placed between the retaining collar and the keeper body. The orientation of the drop down ring is the same with each of the embodiments: prior to installation in a support structure, the components are placed on the bottom section of the tubular body with the top side of the drop down ring located adjacent the retaining collar or retaining sleeve, and the bottom side of the drop down ring located adjacent the pivotable, rotatable ears of the keeper body when said ears are in the closed position. Once the bottom section of the tubular body, along with the keeper body, ears, and drop down ring are passed through the bore, the drop down ring slides down the tubular body assisting in the deployment of the ears to the open position; the drop down ring then nests within the open ears. In the case of placing the mounting fixture on a vertical or overhead support structure, the top section of the tubular body is withdrawn away from the outer surface of the support structure, forcing the drop down ring to spread the ears apart into the open position.

For some applications, the tubular body may be replaced with a solid post, having a right circular cylindrical shape, which is externally threaded on a bottom section thereof, and which includes a plurality of flats on the top section thereof. A solid post provides more strength, however a tube provides the added advantage of allowing electrical wire or conduit, plumbing or other lines to be passed through the hollow portion of the tube. Depending upon the application, the desired lines or tubes may be inserted in the hollow portion prior to, or after, installation of the mounting fixture in the support structure.

BRIEF DESCRIPTION OF THE DRAWINGS

FIG. 6 is a top plan view of the retaining collar;

FIG. 6A is a bottom plan view of the retaining collar;

FIG. 7 is a top plan view of the keeper body with the ears in the open position;

FIG. 7A is a bottom plan view of the keeper body with the ears in the open position;

DETAILED DESCRIPTION OF THE PREFERRED EMBODIMENT

Figure 1:
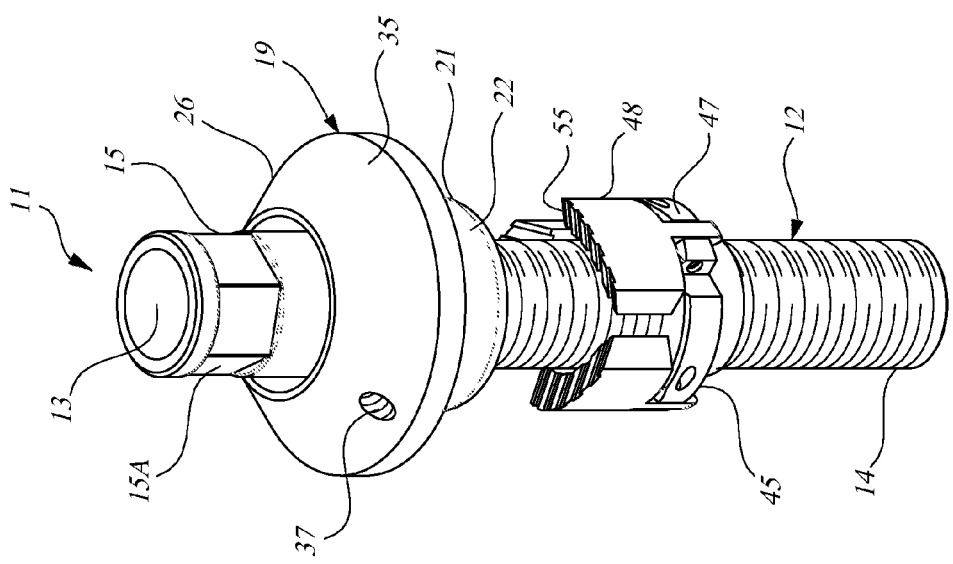
FIG. 1 is a perspective view (from above) of the mounting fixture with the ears, which are mounted to the keeper body, in the closed position.

Turning now to the drawings, FIG. 1 and show the mounting fixture 11 of the present invention, comprising fixture for mounting on a support structure 16. Support structure 16 has an outer surface 17 and an inner surface 18 having a thickness 20 therebetween. Thickness 20 is provided with a bore 38 therethrough. Fixture 11 includes a tubular body 12, a retaining collar 19, a keeper body 41, and pivotable, rotatable ears 48.

The tubular body 12 is aright circular cylindrical tube having a hollow center 13. The tubular body 12 has a bottom section 14 which is externally threaded, and a top section 15. The top section 15 further includes a plurality of flats 15A, for engagement of the top section 15 by a wrench to tighten or loosen fixture 11. The top section 15 and bottom section 14 of the tubular body are most clearly seen in FIG. 5. It will be appreciated that alternatives to the plurality of flats 15A exist to tighten or loosen the fixture 11, such as providing a hole or a slot transversely through said top section 15 for engagement by a screwdriver or another tool as a handle, or providing internal facets forming a socket inside the hollow center 13.

The hollow center 13 provides a passage way for electrical wires, plumbing lines, or the like, to be passed through the support structure 16 either from above the outer surface 17 to below the inner surface 18, or from below the inner surface 18 to above the outer surface 17.

In alternative configurations, the top section 15 of tubular body 12 may be sized and shaped differently than the bottom section 14. Furthermore, it may be desirable in some applications that the tubular body 12 be a solid post rather than a hollow tube.

The retaining collar 19 has a circular lower portion 21 an upper portion 26, with an aperture 30 through the center of said retaining collar 19, as shown in FIGS. 6 and 6A.

The upper portion 26 of retaining collar 19 is frustoconical, having an inside diameter greater than the outside diameter of the tubular body 12, said upper portion 26 further having an outside surface 35 and an inside surface 36. The upper portion 26 of the retaining collar 19 has an upper edge 28 and a lower outside edge 31 (see FIGS. 2 and 5).

Figure 2:
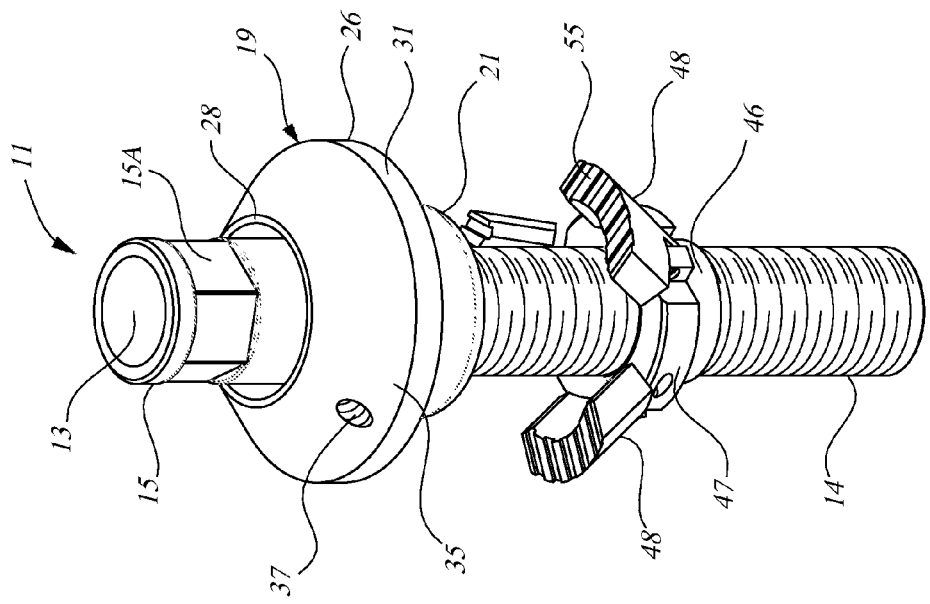
FIG. 2 is a perspective view (from above) of the mounting fixture with the ears, which are mounted to the keeper body, in the open position.
Figure 3:
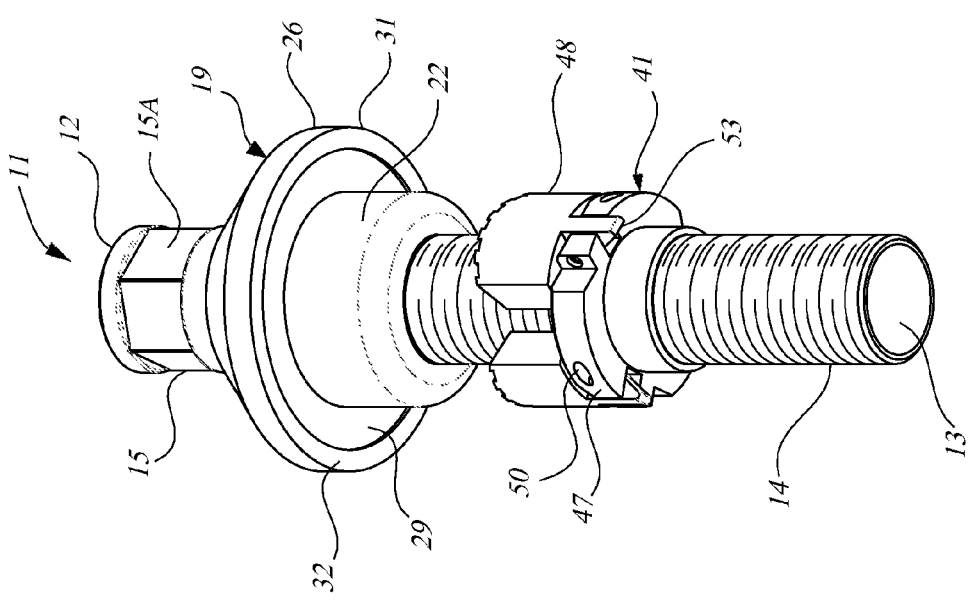
FIG. 3 is a perspective view (from below) of the mounting fixture with the ears, which are mounted to the keeper body, in the closed position.
Figure 10:
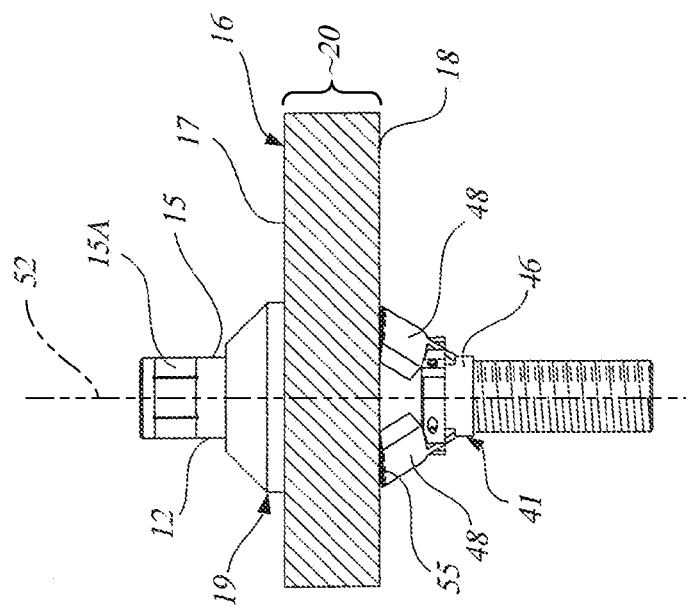
FIG. 10 is an elevational view of the mounting fixture installed in a support structure, showing the retaining collar secured against the outer surface of the support structure, and the ears of the keeper body deployed in the open position with the biting surfaces of the ears engaging the inner surface of the support structure.

The upper portion 26 of retaining collar 19 has a partial lower surface 29 as seen in FIGS. 2 and 3. The lower surface 29 of the upper portion 26 is sized to extend beyond bore 38 and to be adjacent to outer surface 17 when fixture 11 is installed in support structure 16 as shown in FIG. 10.

Figure 4:
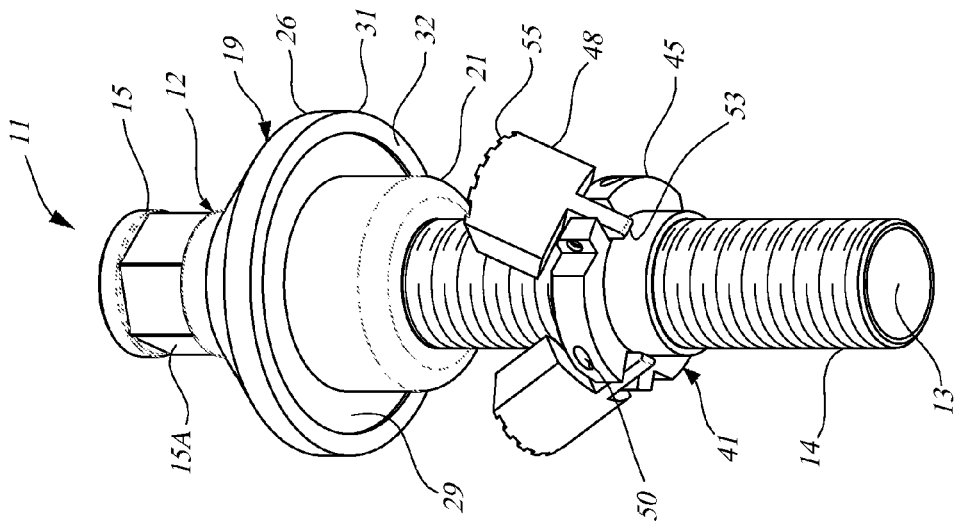
FIG. 4 is a perspective view (from below) of the mounting fixture with the ears, which are mounted to the keeper body, in the open position.

The lower surface 29 of the upper portion 26 further includes a lip 32 as shown in FIGS. 3, 4, and 6A. It will be understood that a gasket (not shown) may be placed against said lower surface 29 inside lip 32, if a tight seal is desired between the lower surface 29 of retaining collar 19 and the outer surface 17 of support structure 16.

The lower portion 21 of retaining collar 19 has an outside surface 22 with a diameter slightly smaller than the diameter of bore 38 in support structure 16. The outer portion 21 has an internally threaded inner surface 24, the diameter of said internally threaded inner surface 24 sized to be threaded onto the bottom section 14 of tubular body 12.

As the inside diameter of the upper portion 26 of retaining collar 19 is greater than the diameter internally threaded inner surface 24 of the lower portion 21, a ledge 33 is formed internally at the interface of said upper portion 21 and said lower portion 26.

The upper portion 26 of retaining collar 19 further includes at least one threaded hole 37 passing from the outside surface 35 to the inside surface 36 as shown by phantom lines 39 in FIG. 6. The retaining collar 19 further includes at least one set screw sized and configured to be placed within the threaded hole 37. The set screw may be used to secure additional components in nesting relation with the inside surface 36 of the upper portion 26 of retaining collar 19, the ledge 33, and the top section 15 of tubular body 12. Shapes alternative to frustoconical exist for the outside surface 36 of retaining collar 19, including, by way of example, cylindrical or pyramidal.

Figure 5:
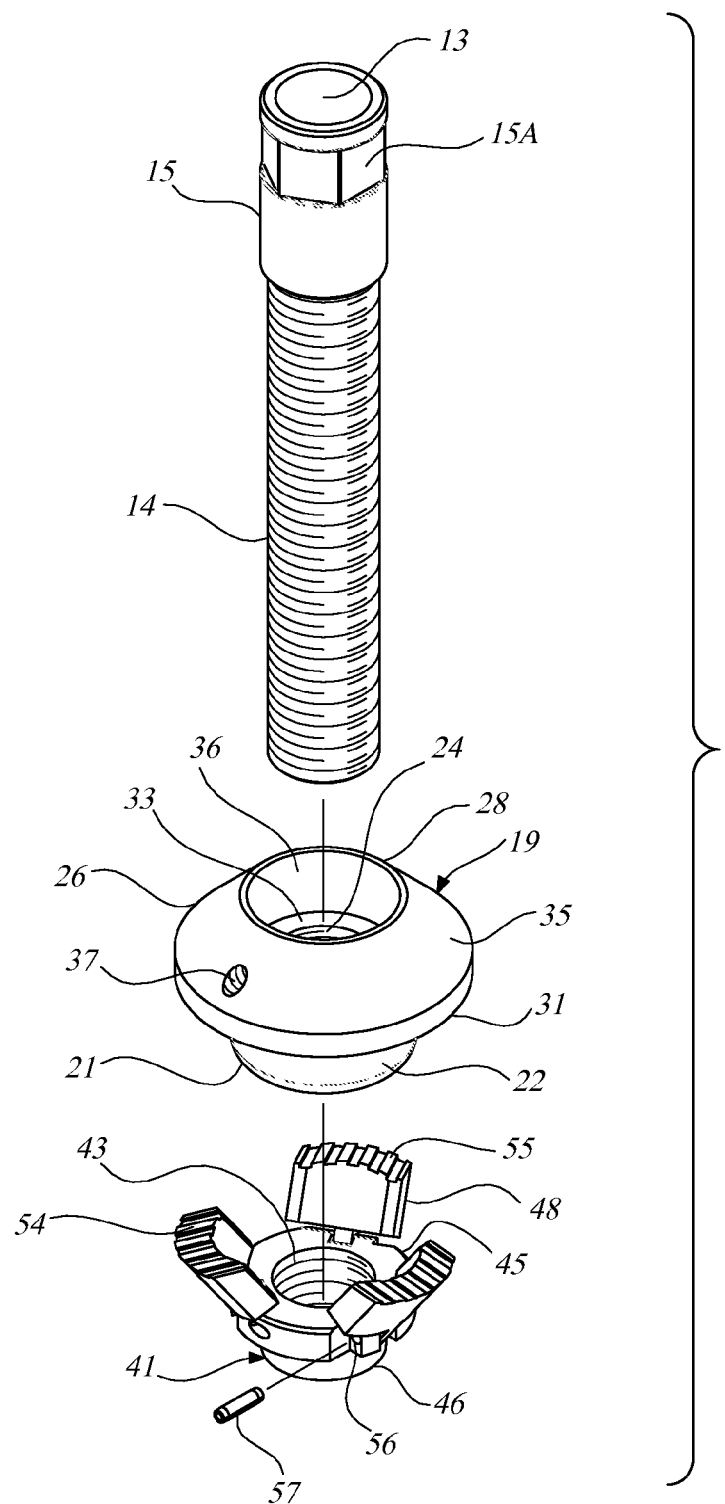
FIG. 5 is an exploded perspective view of the invention, showing the tubular body, retaining collar, and keeper body with the ears in the open position.

The keeper body 41 has a circular passageway 42 with an internally threaded surface 43 as seen in FIG. 5. The diameter of said passageway 42 is sized to be threaded onto said bottom section 14 of the tubular body 12.

The keeper body 41 includes ring-shaped upper part 45 and a lower part 46 as best seen in FIGS. 3 and 4.

The upper part 45 of keeper body 41 has an outside 47 and an outer diameter slightly smaller than the diameter of the bore 38 in support structure 16. The lower part 46 has a smaller diameter than said upper part 45 of the keeper body.

The upper part 45 of the keeper body 41 further includes three (3) equally spaced cutouts in the outside 47, with a hole 56 extending from a first point on the outside 47 to a second point on the outside 47, through the cutout section and terminating at aperture 50 in the outside 47.

Fixture 11 further includes three (3) equally spaced pivotable, rotatable ears 48 attached at the points of the cutouts in the upper part 45 of keeper body 41. The ears 48 are pivotable from a first closed position as shown to FIGS. 1 and 3, to a second open position wherein said ears 48 deploy away from the center axis 52 (shown in FIG. 10 in phantom line) of the circular passageway 42 in keeper body 41.

The diameter taken across the ears 48 when they are in the closed position is no greater than said outside diameter of the lower portion 21 of retaining collar 19.

The ears 48 have a lower end 53 and an upper edge 54. The lower end 53 is a pivot arm with an inside taper as seen in FIG. 3. The lower end 53 acts as a limit stop when said lower end 53 rests against the surface of lower part 46 of keeper body 41 when said ears 48 are deployed into the open position as shown in FIG. 4. Lower end 53 includes a hole positioned to line up with hole 56 and aperture 50 in upper part 45 of the keeper body 41.

Figure 11:
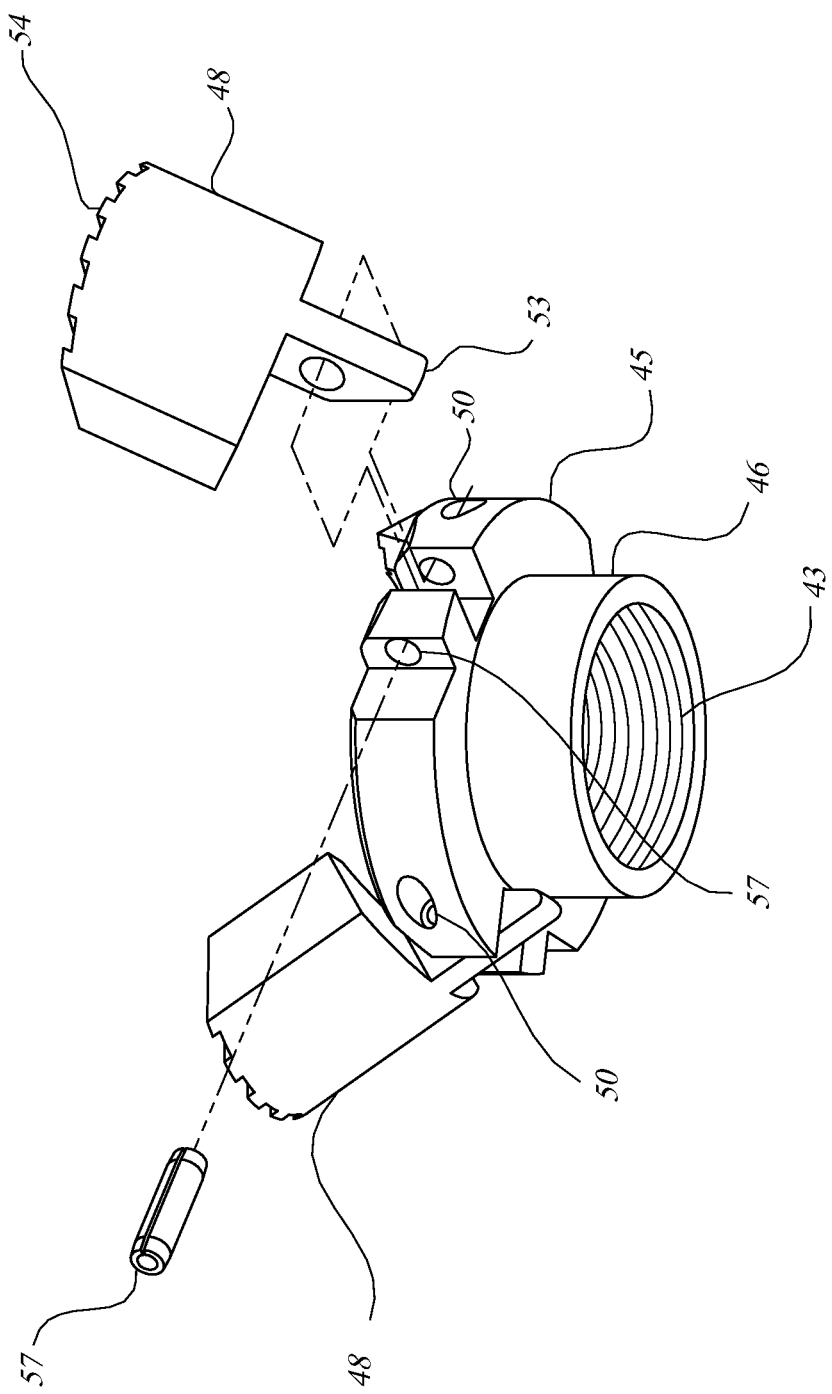
FIG. 11 is a partially exploded perspective view (from below), taken to an enlarged scale, showing the detail of the attachment of the ears to the upper part of the keeper body.

The lower end 53 of the ears 48 are attached to the upper part 45 of the keeper body by means of a spring pin 57 passing through hole 56 and the hole in lower end 53 and into aperture 50. These attachment features of the ears 48 to the upper part 45 of the keeper body 41 are best seen in FIG. 11.

The upper edges 54 of ears 48 include biting surfaces 55 to help prevent slippage when said upper edges 54 are secured against the inner surface 18 of support surface 16. There are many biting surfaces 55 which may be used for this purpose depending on the material of the inner surface 18. By way of example, such biting surfaces 55 include a plurality of grooves, teeth, and nubs, as well as rubberized coatings or material applied or affixed to the upper edges 54 of ears 48.

In another embodiment of the invention, the mounting fixture 11 further includes a sneeze guard support post 61 (shown partially in phantom lines in FIG. 9 to aid in seeing the details of top section 15 of tubular body 12) which is attached to the top section of the tubular body 12. The tubular body 12, the retaining collar 19, the keeper body 41 and the ears 48 are as described above. The sneeze guard support post 61 is a right circular cylindrical tube having a lower end, the inside diameter of which is slightly larger than the outside diameter of the tubular body 12, and the outside diameter of the support post 61 is slightly smaller than the inside diameter of the upper portion 26 of the retaining collar 19. When assembled, the lower end 62 of the support post 61 is in nesting relation with the inside surface 36 of the upper portion 26 of retaining collar 19, the ledge 33, and the top section 15 of tubular body 12, and is secured by the set screw 63 through threaded hole 37, which set screw constitutes means for attaching sneeze guard support post 61 to top section 15 of tubular body 12.

The order of assembly of the mounting fixture 11 from FIG. 5. The retaining collar 19 is threaded onto the bottom section 14 of tubular body 12 to a point adjacent the top section 15 of the tubular body 12, then the keeper body 41 with ears 48 is threaded onto the bottom section 14 of the tubular body 12 to a point wherein the distance between the lower surface of the retaining collar 19 and the upper edge of said ears 48 in the closed position is greater than the thickness 20 of support structure 16. This final positioning is shown in FIG. 8.

Figure 8:
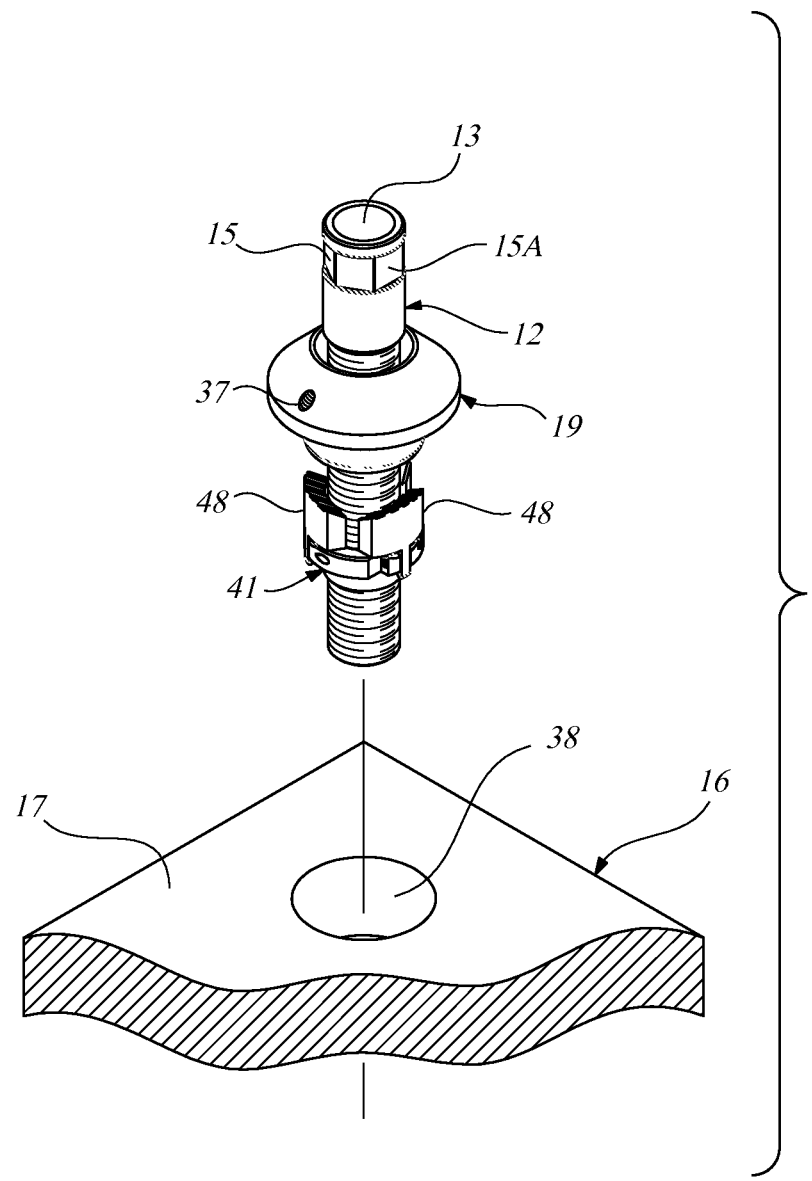
FIG. 8 is a perspective view (from above) of the mounting fixture positioned to be installed through the bore in a support structure (shown cut away), with the ears of the keeper body in the closed position.
Figure 9:
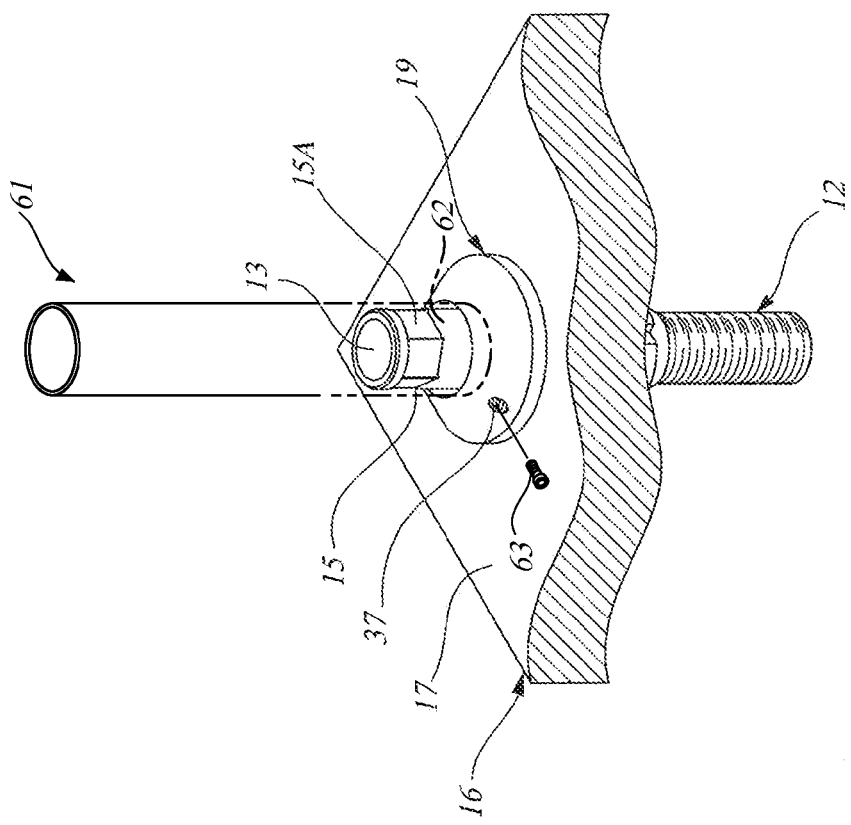
FIG. 9 is a perspective view (from above) of the mounting fixture installed through the bore in a support structure (shown cut away) including a sneeze guard support post (shown partially in phantom lines)

The method of using the mounting fixture 11 is illustrated in FIGS. 8, 9 and 10. FIG. 8 shows the mounting fixture 11 positioned directly over the outer surface 17 and bore 18 in the support structure 16, with the ears 48 in the closed position. Turning to FIG. 9, it can be seen that a portion of the bottom section 14 of the tubular body 12 has passed through the bore 38 in support structure 16, the lower surface 29 of the upper portion 26 of retaining collar 19 is adjacent the outer surface 17 of the support structure 16. In FIG. 10, ears 48 have been deployed into the open position, and the top section 15 of tubular body 12 has been rotated by means of engaging the plurality of flats 15A, drawing the upper edges 54 and biting surfaces 55 tightly against the inner surface 18 of the support structure 16.

Yet another embodiment of the mounting fixture 11 is illustrated in FIGS. 12 through 17. In this embodiment, retaining collar 19 is replaced by retaining sleeve with flange 71, and a drop down ring 85 has been included.

Figure 12:
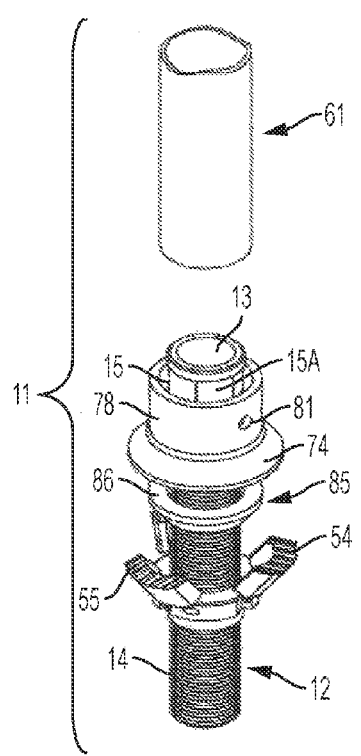
FIG. 12 is a perspective view (from above) of another embodiment of the mounting fixture with a sneeze guard support post (shown cut away at the top) positioned to be installed over the top section of the tubular body.
Figure 13:
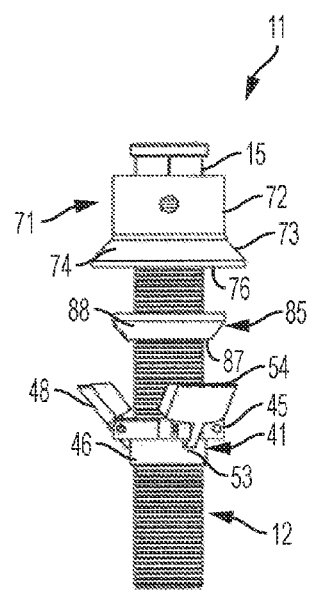
FIG. 13 is an elevational view of the embodiment of the mounting fixture in FIG. 12 showing, for illustrative purposes, the order of installation, on the tubular body, of the retaining sleeve with flange, the drop down ring, and the keeper body, however, it should be noted with respect to FIGS. 12 and 13 that, while the retaining sleeve with flange and keeper body are threadably attached, the drop down ring slides freely along the tubular body therebetween.

In FIGS. 12 and 13, the relative positioning, on tubular body 12, of retaining sleeve with flange 71, drop down ring 85, and keeper body 41 with ears 48 is shown. The placement of drop down ring 85, between retaining sleeve with flange 71 and keeper body 41, is shown for illustrative purposes and it will be understood that, in the preferred embodiment, drop down ring 85 will slide freely along tubular body 12 to assist in the deployment of ears 48 to the open position after said ears 48 have passed through bore 38.

Figure 14:
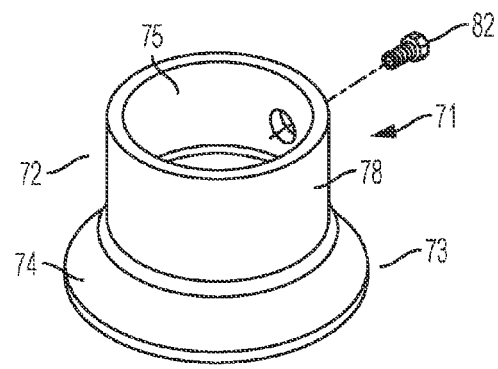
FIG. 14 is a perspective view (from above) of the retaining sleeve with flange.
Figure 15:
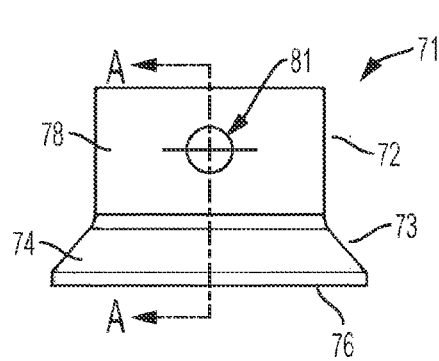
FIG. 15 is an elevational view of the retaining sleeve with flange.

As shown in FIGS. 14 and 15, retaining sleeve with flange 71 has an upper portion 72 and a lower portion 73. The upper portion 72 of retaining sleeve with flange 71 is right circular cylindrical, and the lower portion 73 is flared to form a flange 74. Retaining sleeve with flange 71 includes an aperture 75 extending through said upper portion 72 and said lower portion 73. The lower portion 73 of said retaining sleeve with flange 71 has a lower surface 76, said lower surface 76 having an outside diameter larger than the diameter of the bore 38 in the support structure 16.

The upper portion 72 of retaining sleeve with flange 71 has an inside diameter greater than the diameter of tubular body 12. Upper portion 72 of said retaining sleeve with flange 71 further has an inside diameter greater than the inside diameter of the lower portion 73 of retaining sleeve with flange 71. The differential in these diameters forms a ledge 80 at the interface of the upper portion 72 and the lower portion 73. Ledge 80 further may include a groove 83 encircling said ledge 80. These features are best seen in the cross-sectional view shown in FIG. 15A. Groove 83 is designed to receive the lower end 62 of sneeze guard support post 61, or other similar right circular cylindrical structure. The inclusion of groove 83 provides additional strength and stability to mounting fixture 11 under some circumstances.

The inner surface 84 of the lower portion 73 of the retaining sleeve with flange 71, from ledge 80 to lower surface 76 is provided with internal threads. The diameter of said internally threaded lower portion 73 of the retaining sleeve with flange 71 is sized and configured to be threaded onto the bottom section 14 of the tubular body 12.

Figure 15A:
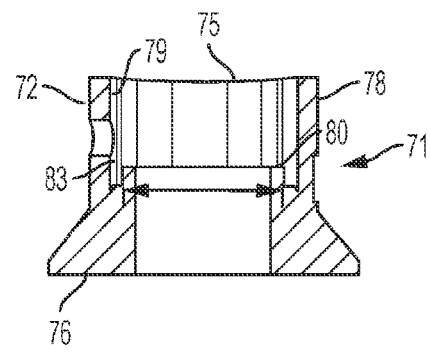
FIG. 15A is cross-sectional view taken through the line A-A in FIG. 15, showing the groove in the ledge.

As shown in FIG. 15A, retaining sleeve with flange 71 has an outer surface 78 and an inner surface 79. A threaded hole 81 (shown in FIGS. 14 and 15) passes through retaining sleeve with flange 71 from said outer surface 78 to said inner surface 79. A set screw 82 is used to secure sneeze guard support post 61, or other similar structure, within the upper portion 72 of retaining sleeve 71.

Figure 16:
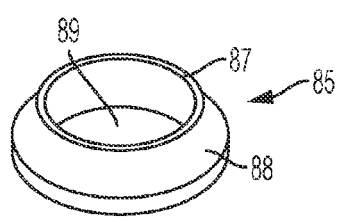
FIG. 16 is a perspective view (from below) of the drop down ring.
Figure 17:
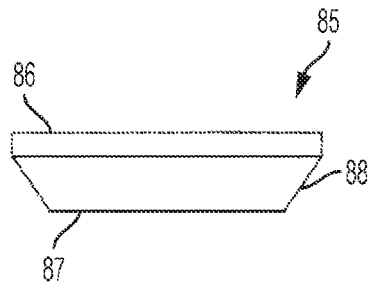
FIG. 17 is an elevational view of the drop down ring.

The drop down ring 85 is shown in FIGS. 16 and 17. The drop down ring 85 is circular in shape having a hole 89 through the center. The diameter of hole 89 of drop down ring 85 is slightly larger than tubular body 12, so that drop down ring 85 will slide over tubular body 12. The outer diameter of drop down ring 85 is slightly smaller than the diameter of bore 38.

Drop down ring 85 has a top side 86 (see FIG. 17), a bottom side 87 as seen in FIG. 16, and an outer side surface 88. Although a completely ring shaped structure may be used, in the preferred embodiment, the outer side surface 88 of drop down ring 85 is tapered from top side 86 to said bottom side 87, as shown in FIGS. 16 and 17.

The method of using this alternate embodiment of mounting fixture 11 is the same as illustrated in FIGS. 8, 9 and 10, with the modifications discussed following. Mounting fixture 11, comprising tubular body 12 onto which retaining sleeve with flange 71, drop down ring 85, and keeper body 41 have been installed as shown in FIGS. 12 and 13, is positioned directly over the outer surface 17 and bore 18 in the support structure 16, with the ears 48 in the closed position. With ears 48 in the closed position, a portion of the bottom section 14 of the tubular body 12, the keeper body 41 and the ears 48, along with the drop down ring 85 are passed through the bore 38 in the support structure 16 from the outer surface 17 to a point where the lower surface 76 of the lower portion 73 of said retaining sleeve with flange 71 is positioned against the outer surface 17 of said support structure 16. The drop down ring 85 is allowed to slide down tubular body 12 against the ears 48, deploying said ears 48 into an open position. The tubular body 12 is rotated to draw the biting surfaces 55 of the upper edges 54 of the deployed ears 48 securely against the inner surface 18 of the support structure 16. In some applications, the top section 15 of tubular body 12, may need to be pulled away from outer surface 17 of support structure 16, and retaining sleeve with flange 71 tightened against the outer surface 17, to secure upper edges 54 of the ears 48 of the keeper body 41 tightly against the inner surface 18 of support structure 16.

In any of the embodiments, once mounting fixture 11 is installed on the support structure 16, additional components, such as a sneeze guard support leg may be attached as described above. Additional embodiments exist for which the descriptive language might be changed due to spatial orientation. Although shown in the preferred embodiment as mounted on the outer surface of a horizontal structure, such as a counter, table or ceiling, the mounting fixture disclosed herein could be used in a vertical orientation, such as on a wall.

What is claimed is:

1. A fixture for mounting on a support structure having an outer surface and an inner surface, the outer and inner surfaces having a thickness therebetween, with a bore extending through said thickness, comprising:

a. a tubular body, said tubular body having a top section and a bottom section, said bottom section being a right circular cylindrical, and having external threads;

b. a retaining sleeve with flange, said retaining sleeve with flange having an upper portion and a lower portion, said upper portion being right circular cylindrical and said lower portion being flared to form a flange, with an aperture extending through said upper portion and said lower portion; said lower portion of said retaining sleeve with flange having a lower surface, said lower surface having an outside diameter larger than the diameter of the bore in the support structure; said upper portion of the retaining sleeve with flange having an inside diameter greater than the diameter of said tubular body, and said upper portion of said retaining sleeve with flange further having an inside diameter greater than the inside diameter of said lower portion, and a ledge at the interface of said upper portion and said lower portion; and, said aperture in said lower portion further having internal threads, the diameter of said internally threaded lower portion of said retaining sleeve with flange sized to be threaded onto said bottom section of said tubular body;

c. a drop down ring, said drop down ring being circular having a top side, a bottom side, and an outer side surface, and further having an outside diameter slightly smaller than the bore in the support structure; and, said drop down ring further having a hole passing through the center, said hole sized to fit slidably over the tubular body; and, d. a keeper body, said keeper body having an internally threaded circular passageway, the diameter of said passageway sized to be threaded onto said bottom section of the tubular body, said keeper body including an upper part having an outside diameter slightly smaller than the diameter of the bore in the support structure, and a lower part having a smaller diameter than said upper part; said keeper body further including one or more pivotable, rotatable ears mounted to the outside of said upper part of the keeper body, said ears being pivotable from a first closed position wherein the diameter through said ears in said closed position is slightly smaller than the bore in the support structure, to a second open position wherein said ears deploy away from the center axis of said passageway in the keeper body, each of said ears further including at least one limit stop, whereby said retaining sleeve with flange, said drop down ring, and said keeper body are placed onto said tubular body, said bottom section of the tubular body, the keeper body with the ears in the closed position, and the drop down ring are passed through the bore in the support structure, the drop down ring is slid down the tubular body to contact the ears, the ears are deployed into the open position, and said ears are secured against inner surface of said support structure.

2. The fixture of claim 1 in which said tubular body further includes a plurality of flats on said top section.

3. The fixture of claim 1 in which said ledge at the interface of said upper portion and said lower portion of said retaining sleeve with flange further includes a groove encircling said ledge.

4. The fixture of claim 1 in which at least a portion of said outer side surface of said drop down ring is tapered from said top side to said a bottom side.

5. The fixture of claim 1 in which said ears include an upper edge having a biting surface.

6. The fixture of claim 5 in which said biting surface comprises a plurality of grooves.

7. The fixture of claim 1 in which said ears deploy to approximately 45 degrees from the center axis of said passageway in the keeper body.

8. The fixture of claim 1 in which said tubular body comprises a right circular cylindrical tube further having a hollow portion therethrough.

9. The fixture of claim 1 in which said tubular body comprises a right circular cylindrical post.

10. A fixture for mounting on a support structure having an outer surface and an inner surface, said outer and inner surfaces having a thickness therebetween, with a bore extending through said thickness, comprising:
   a. a tubular body, said tubular body comprises a right circular cylindrical tube, having a top section and a bottom section, said bottom section being externally threaded;
   b. a retaining sleeve with flange, said retaining sleeve with flange having an upper portion and a lower portion, said upper portion being a right circular cylindrical and said lower portion being flared to form a flange with an aperture extending through said upper portion and said lower portion; said lower portion of said retaining sleeve with flange having a lower surface, said lower surface of said flange having an outside diameter larger than the diameter of the bore in the support structure; said upper portion of the retaining sleeve with flange having an inside diameter greater than the diameter of said tubular body, and said upper portion of said retaining sleeve with flange further having an inside diameter greater than the inside diameter of said lower portion, and a ledge at the interface of said upper portion and said lower portion; and, said aperture in said lower portion further having internal threads, the diameter of said internally threaded lower portion of said retaining sleeve with flange sized to be threaded onto said bottom section of said tubular body;
   c. a drop down ring, said drop down ring being circular having a top side, a bottom side, and an outer side surface, and further having an outside diameter slightly smaller than the bore in the support structure; said outer side surface being tapered from said top side to said bottom side; and, said drop down ring further having a hole passing through the center, said hole sized to fit slidably over the tubular body;
   d. a keeper body, said keeper body having an internally threaded circular passageway, the diameter of said passageway sized to be threaded onto said bottom section of the tubular body, said keeper body including a ring shaped upper part having an outside surface and an outside diameter slightly smaller than the diameter of the bore in the support structure, and a lower part having a smaller diameter than said upper part; said keeper body further including at least one hole extending from a first point on the outside surface of said upper part to a second point on the outside surface of said upper part and further including a cut out between said first point and said second point;
   e. one or more pivotable, rotatable ears having an upper edge and a lower end, said lower end providing a stop, said lower end of said ears being mounted to the outside of said upper part of the keeper body between said first point and said second point by means of a pin through said hole in said keeper body, said ears being pivotable from a first closed position wherein the diameter through said ears in said closed position is slightly smaller than the bore in the support structure, to a second open position wherein said ears deploy away from the center axis of said passageway in the keeper body;
   f. a sneeze guard support post, said sneeze guard support post comprises a right circular cylindrical tube having an upper end and a lower end, and further having an inside diameter slightly larger than the outside diameter of said tubular body and an outside diameter slightly smaller than the inside diameter of said upper portion of the retaining sleeve with flange; and,
   g. means for attaching said sneeze guard support post to said top section of the tubular body, whereby said retaining sleeve with flange is threaded onto the tubular body, said drop down ring is then slid onto the tubular body, and said keeper body is threaded onto said tubular body with ears toward the drop down ring, said bottom section of the tubular body, the keeper body with the ears in the closed position, and the drop down ring are passed through the bore in the support structure, the drop down ring is slid down the tubular body to contact the ears, the ears are deployed into the open position, said ears are secured against inner surface of said support structure, and said sneeze guard support post is attached to said top section of the tubular body.

11. The fixture of claim 10 in which said lower end of said sneeze guard post is in nesting relation with said inside surface of said upper portion of the retaining sleeve with flange, said ledge, and said top section of the tubular body.

12. The fixture of claim 10 in which said ledge further includes a groove encircling said ledge.

13. The fixture of claim 12 in which said lower end of said sneeze guard post is positioned within said groove.

14. The fixture of claim 10 in which said upper portion of the retaining sleeve with flange further includes an outside surface and an inside surface with at least one threaded hole passing therebetween, and at least one set screw sized and configured to be placed within said threaded hole.

15. The fixture of claim 10 in which said pin comprises a spring pin.

16. The fixture of claim 10 in which said upper edges of said ears include a biting surface.

17. The fixture of claim 16 in which said biting surface comprises a plurality of grooves.

18. A method for mounting a fixture on a support structure comprising the steps of:
   a. providing a support structure having an outer surface and an inner surface, said outer and inner surfaces having a thickness therebetween;
   b. providing a bore through said thickness;
   c. providing a tubular body, said tubular body having top section and a bottom section, said bottom section being a right circular cylindrical and having external threads;
   d. providing a retaining sleeve with flange, said retaining sleeve with flange having an upper portion and a lower portion, said upper portion being right circular cylindrical and said lower portion being flared to form a flange with an aperture extending through said upper portion and said lower portion; said lower portion of said retaining sleeve with flange having a lower surface, said lower surface having an outside diameter larger than the diameter of the bore in the support structure; said upper portion of the retaining sleeve with flange having an inside diameter greater than the diameter of said tubular body, and said upper portion of said retaining sleeve with flange further having an inside diameter greater than the inside diameter of said lower portion, and a ledge at the interface of said upper portion and said lower portion; and, said aperture in said lower portion further having internal threads, the diameter of said internally threaded lower portion of said retaining sleeve with flange sized to be threaded onto said bottom section of said tubular body;
   e. threading said retaining sleeve with flange onto said bottom section of the tubular body to a point adjacent said top section of the tubular body;
   f. providing a drop down ring, said drop down ring being circular having a top side, a bottom side, and an outer side surface, and further having an outside diameter slightly smaller than the bore in the support structure; said outer side surface being tapered from said top side to said bottom side; and, said drop down ring further having a hole passing through the center, said hole sized to fit slidably onto the tubular body;
   g. sliding said drop down ring onto said bottom section of the tubular body below the retaining sleeve with flange;
   h. providing a keeper body, said keeper body having an internally threaded circular passageway, the diameter of said passageway sized to be threaded onto said bottom section of the tubular body, said keeper body including a ring shaped upper part having an outside surface and an outside diameter slightly smaller than the diameter of the bore in the support structure, and a lower part having a smaller diameter than said upper part; said keeper body further including at least one hole extending from a first point on the outside surface of said upper part to second point on the outside surface of said upper part and further including a cut out between said first point and said second point;
   i. providing one or more pivotable, rotatable ears, said ears having an upper edge and a lower end, said lower end providing a stop, said lower end of said ears being mounted to the outside of said upper part of the keeper body between said first point and said second point by means of a pin through said hole in said keeper body, said ears being pivotable from a first closed position wherein the diameter through said ears in said closed position is slightly smaller than the bore in the support structure, to a second open position wherein said ears deploy away from the center axis of said passageway in the keeper body; and, said ears further having a biting surface on said upper edge;
   j. threading said keeper body onto said bottom section of the tubular body to a point where the upper edge of the ears in the closed position will be below the inner surface of the support structure when a portion of the bottom section of the tubular body, the drop down ring, and the keeper body are passed through the bore;
   k. with said ears in the closed position, passing a portion of said bottom section of the tubular body, the keeper and the ears, and the drop down ring through said bore in the support structure from the outer surface thereof to a point where the lower surface of the lower portion of said retaining sleeve with flange is adjacent the outer surface of said support structure;
   l. allowing the drop down ring to slide against the ears, deploying said ears into an open position; and,
   m. rotating the tubular body to draw the biting surfaces of the upper edges of the deployed ears securely against the inner surface of the support structure.

19. A method as in claim 18 in which said method further includes the steps providing a sneeze guard support post comprising a right circular cylindrical tube having an upper end and a lower end, and further having an inside diameter slightly larger than the outside diameter of said tubular body and an outside diameter slightly smaller than the inside diameter of said upper portion of the retaining sleeve with flange, and placing said lower end of said sneeze guard support post over said top section of the tubular body so that said lower end of said sneeze guard post is in nesting relation with said inside surface of said upper portion of the retaining sleeve with flange, said ledge, and said top section of the tubular body.

* * * * *